United States Patent
Cyr

(10) Patent No.: US 11,579,948 B2
(45) Date of Patent: Feb. 14, 2023

(54) APPLICATION PROGRAMMING INTERFACE FOR WEB PAGE AND VISUALIZATION GENERATION

(71) Applicant: THE BOEING COMPANY, Chicago, IL (US)

(72) Inventor: Kenneth J. Cyr, Flower Mound, TX (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/351,171

(22) Filed: Mar. 12, 2019

(65) Prior Publication Data
US 2020/0293388 A1 Sep. 17, 2020

(51) Int. Cl.
G06F 9/54 (2006.01)
G06F 16/25 (2019.01)
G06F 16/958 (2019.01)
G06F 40/14 (2020.01)
H04L 67/01 (2022.01)

(52) U.S. Cl.
CPC ............ *G06F 9/547* (2013.01); *G06F 16/258* (2019.01); *G06F 16/986* (2019.01); *G06F 40/14* (2020.01); *H04L 67/01* (2022.05)

(58) Field of Classification Search
CPC ........ G06F 9/547; G06F 16/258; G06F 40/14; G05F 16/986; H04L 67/42
See application file for complete search history.

(56) References Cited

U.S. PATENT DOCUMENTS

| | | | |
|---|---|---|---|
| 9,633,073 B1* | 4/2017 | Allen | G06F 16/2462 |
| 10,282,241 B1* | 5/2019 | Kennedy, Jr. | H04L 63/083 |
| 2003/0109973 A1* | 6/2003 | Hensey | H04W 12/08 701/32.6 |
| 2008/0134059 A1* | 6/2008 | Kumar | G06F 9/451 715/760 |
| 2009/0259934 A1 | 10/2009 | Prisament | |
| 2010/0262678 A1* | 10/2010 | Morgan | G06F 16/9535 709/220 |
| 2015/0235179 A1* | 8/2015 | Schmidt | G06Q 10/1053 705/321 |
| 2018/0089005 A1* | 3/2018 | Green | G06F 9/54 |
| 2018/0219854 A1* | 8/2018 | Miran | H04L 63/168 |
| 2018/0365702 A1* | 12/2018 | Sehrawat | H04L 51/32 |
| 2019/0121649 A1* | 4/2019 | Silvert | G06F 9/547 |
| 2019/0205111 A1* | 7/2019 | Bennet | H04L 67/34 |
| 2019/0303500 A1* | 10/2019 | Mathews | G06F 16/9566 |
| 2020/0169560 A1* | 5/2020 | Arora | H04L 9/3247 |

* cited by examiner

*Primary Examiner* — Charles E Anya

(57) ABSTRACT

A method of hosting a single page application incudes hosting, at an application programming interface (API) module of a server, the single page application as a first API operation by providing code to a client device to enable rendering of a page at the client device as a user interface presentation.

26 Claims, 9 Drawing Sheets

700

╭─ 702

Host, at an application programming interface (API) module of a server, the single page application as a first API operation by providing code to a client device to enable rendering of a page at the client device as a user interface presentation

╭─ 704

In response to hosting the single page application as the first API operation, perform a second API operation through the single page application, the second API operation connecting the client device and a database to enable access to information stored at the database and to enable presentation of the information at the client device

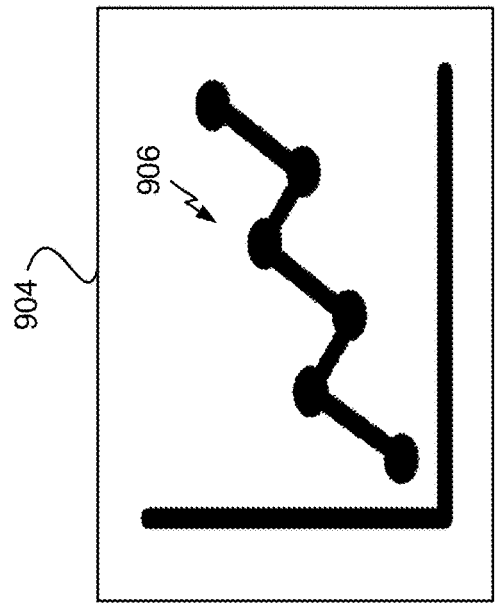
*FIG. 9A*
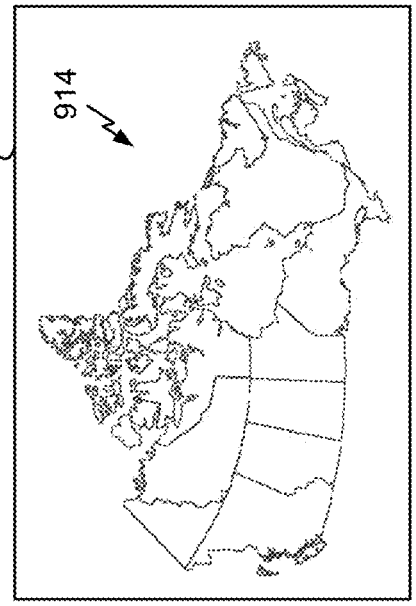
*FIG. 9B*
*FIG. 9C*
*FIG. 9D*

APPLICATION PROGRAMMING INTERFACE FOR WEB PAGE AND VISUALIZATION GENERATION

FIELD

The present disclosure is related to an application programming interface.

BACKGROUND

Application programming interfaces (APIs) can be used to enable server-side messaging for communication between a client device and a backend service. Experienced users and programmers can communicate with a backend service, such as a database, using API call instructions and other API-specific requests. However, an inexperienced user may struggle to successfully communicate using the API. As a result, the inexperienced user may become frustrated and may not be able to communicate with the backend service through the API. In some situations, specialized software may be developed to assist the inexperienced user. However, development of the specialized software can be inefficient due to the countless variations of API configurations.

SUMMARY

According to one implementation of the present disclosure, a system for hosting a single page application includes a server that is configured to host an application programming interface (API) module. The API module is configured to perform a first API operation to host the single page application by providing code to a client device to enable rendering of a page at the client device as a user interface presentation.

According to another implementation of the present disclosure, a method of hosting a single page application incudes hosting, at an application programming interface (API) module of a server, the single page application as a first API operation by providing code to a client device to enable rendering of a page at the client device as a user interface presentation. The method also includes performing a second API operation through the single page application in response to hosting the single page application as the first API operation. The second API operation connects the client device and a database to enable access to information stored at the database and to enable presentation of the information at the client device.

According to another implementation of the present disclosure, an apparatus for operating an API includes a server communicatively coupled to a client device and to a database. The server includes an API module configured to receive, from the client device, an API call to at least one operation associated with the client device and the database. The API call indicates a data format. The API module is also configured to receive data from the database associated with the at least one operation. The API module is further configured to transform the data according to the data format to generate a formatted data output. The API module is also configured to provide the formatted data output to the client device.

According to another implementation of the present disclosure, a client device includes a memory and a processor coupled to the memory. The processor is configured to execute code provided by a server to render a page associated with a single page application hosted by the server to be displayed at a display screen as a user interface presentation.

According to another implementation of the present disclosure, an apparatus for operating an API includes a server communicatively coupled to a client device. The server includes an API module configured to receive, from the client device, an API call to at least one operation associated with the client device. The API module is configured to render a visualization based on the API call. The visualization corresponds to an image of one of a chart, a graph, a map, or hypertext markup language (HTML) text. The API module is also configured to provide the visualization to the client device.

BRIEF DESCRIPTION OF THE DRAWINGS

FIGS. 9A-9D are diagrams of different formatted data outputs.

DETAILED DESCRIPTION

Figure 1:
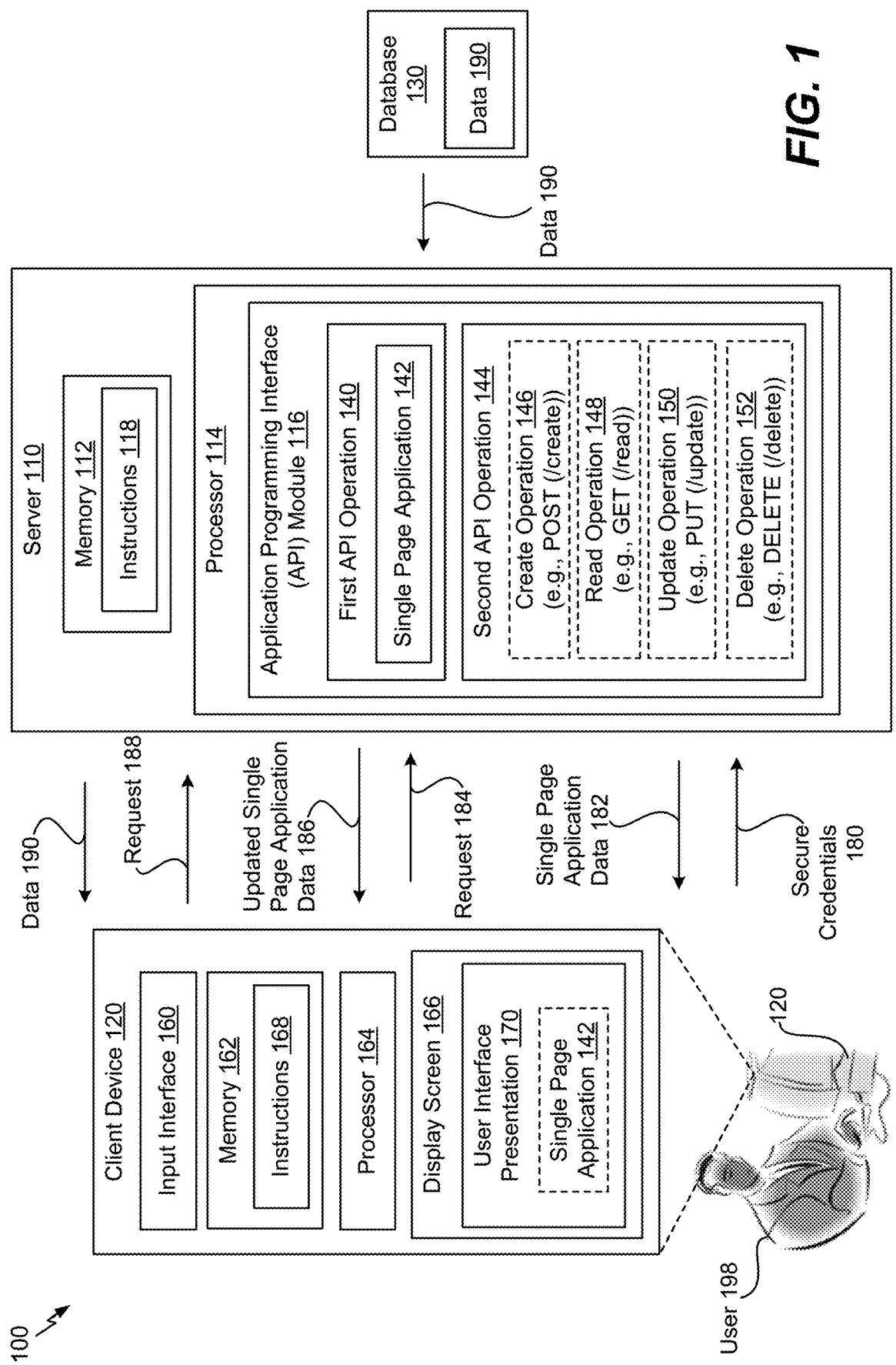
FIG. 1 is a diagram of a system that includes an application programming interface that is configured to host a single page application.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple the user interface presentations are illustrated and associated with reference numbers 170A, 170B, etc. When referring to a particular one of these user interface presentations, such as the user interface presentation 170A, the distinguishing letter "A" is used. However, when referring to any arbitrary one of these user interface presentations or to these user interface presentations as a group, the reference number 170 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

One advantage and technical effect of the implementations described herein is enabling an inexperienced user to interact with a third-party data source (e.g., a backend data service) through an API. For example, in scenarios where the user is unable to successfully generate an API request, the API can host a single page application to assist the user. Prompts associated with the single page application are displayed via a user interface presentation at a client device accessible to the user. Single page application, as used herein, may be or include a web application or web site that interacts with a user by dynamically rewriting the current page to reduce or eliminate loading a new page or querying a server for more information. By populating fields responsive to the prompts, the single page application enables the user to operate the API without developing specialized software. Thus, tasks associated with the API can be streamlined without requiring additional tools. Additionally, the features, functions, and advantages that have been described can be achieved independently in various implementations or may be combined in yet other implementations, further details of which are disclosed with reference to the following description and drawings The implementations described herein provide a solution a technological problem particular to the interne by implementing a solution specific to that technological environment and different from the manner suggested by routine or conventional use within the field.

Techniques described herein enable a user that is inexperienced with respect to application programming interfaces (APIs) to interact with an API through an API-hosted single page application. For example, in scenarios where the user is unfamiliar with or unable to work with a particular API, the API can host the single page application to assist the user. To illustrate, the API can generate prompts (associated with the single page application) that are displayed via a user interface presentation at a client device (accessible to the user). The prompts enable the user to interact with the single page application. For example, by populating fields responsive to the prompts, the single page application enables the user to successfully communicate with a backend system via the API without developing specialized software. Thus, task associated with the API can be streamlined without requiring additional tools. Additionally, the single page application can operate as a secure browser to share information for operating the API. For example, through the user interface presentation, the single page application can present instructions associated with operating the API, code for operating the API, tips for operating the API, and examples for developing API client software.

Techniques described herein also enable an API to transform data (e.g., JSON data) into a requested format. For example, the API can receive an API call from a user. The API indicates a requested data format for data at a backend service. The API can retrieve the data from the backend service and transform the format of the data into the requested format. To illustrate, the API can transform the data into hypertext markup language (HTML) text, an image file of a graph, an image file of a chart, or an image file of a map.

FIG. 1 is a diagram of a system 100 that includes an application programming interface that is configured to host a single page application. The system 100 includes a server 110, a client device 120 communicatively coupled to the server 110, and a database 130 communicatively coupled to the server 110. The database 130 can correspond to a backend data service or website.

A user 198 can operate the client device 120 to interact with the server 110. The client device 120 can be a computer, a laptop, a mobile phone, a personal digital assistant, a tablet, etc. The client device 120 includes an input interface 160, a memory 162, a processor 164, and a display screen 166. The input interface 160 can receive an input (e.g., a text input, a cursor input, etc.) from an input device, such as a keyboard, a mouse, etc. The memory 162 is a non-transitory computer-readable device that includes instructions 168 that are executable by the processor 164.

The server 110 includes a processor 114 and a memory 112. An application programming interface (API) module 116 is integrated into the processor 114. The memory 112 is a non-transitory computer-readable device that includes computer-executable program instructions 118 (or code). The computer-executable program instructions 118 are executable by the processor 114 (or the API module 116) to perform the operations described herein. The API module 116 can be implemented using hardware, software (e.g., processor-executable instructions), firmware, or a combination thereof. The server 110 can include other components that are not illustrated in FIG. 1. For example, the server 110 can include a transmitter, a receiver, one or more interfaces, etc.

The API module 116 is configured to perform a first API operation 140 and a second API operation 144. The first operation 140 includes hosting a single page application 142 by providing code to the client device 120 to enable rendering of a page at the client device 120 as a user interface presentation 170. In an illustrative example, the single page application 142 is a web application that loads a single hypertext markup language (HTML) page and dynamically updates the HTML page as the user 198 interacts with the web application. To illustrate, the first operation 140 sends code to the client device 120 that is executable (or interpreted) by the client device 120 to run the single page application 142. For example, dynamically updating the HTML page may reduce or eliminate reloading of information from the server. Non-limiting examples of the code can include HTML text, scripting text (e.g., JavaScript), browser-executable code (e.g., Java applets), or a combination thereof.

The second operation 144 includes one of a create operation 146, a read operation 148, an update operation 150, or a delete operation 152. For example, in the implementation of FIG. 1, the API module 116 operates as a messaging interface between the client device 120 and the database 130 to enable the client device 120 to perform access (create, read, update, or delete) operation associated with data stored in the database 130. For example, the user 198 of the client device 120 can send a request to the API module 116 to perform an access operation with respect to the database 130. However, if there is a problem with the request (e.g., a formatting problem), the user 198 may not be able to efficiently troubleshoot the problem to enable performance of the access operation if the user 198 is inexperienced. For example, the API module 116 can return an error message indicating that the request has failed, and the inexperienced user 198 may not be able to identify the problem with the request in order to modify the request in light of the error message. Although the API module 116 depicted in FIG. 1 is described as being configured to perform access operations, in other implementations, the API module 116 can be configured to perform different operations in conjunction with hosting a single page application.

To assist API users, the API module 116 of the server 110 is configured to perform a first API operation 140 to host a single page application 142. As described below, the single page application 142 can operate as a secure browser-based resource to share information (e.g., documentation, tips, examples, sample code, etc.) about the API module 116 to assist the user 198 of the client device 120 with API operations. In addition to, or instead of, sharing information about the API module 116, the single page application 142 can be used to generate prompts to assist the user 198 with the API operations, including the second API operation 144.

To illustrate, the client device 120 is configured send secure credentials 180 to the server 110. According to one implementation, the secure credentials 180 can include a user name and a password. The server 110 can identify an API key of a particular API (e.g., an API key of the API module 116) associated with the secure credentials 180. In response to identifying the API key, the API module 116 performs the first API operation 140 to host the single page application 142. During the first API operation 140, the API module 116 determines the access operations 146-152 subscribed to by the client device 120 based on the secure credentials 180. As described below with respect to FIGS. 2-4, the access operations 146-152 subscribed to by the client device 120 can be initiated based on user interactions with the single page application 142. For example, during the first API operation 140, the API module 116 determines whether the client device 120 is subscribed to a create operation 146, a read operation 148, an update operation 150, a delete operation 152, or a combination thereof. In an illustrative example, described herein for ease of explanation, the client device 120 is subscribed to the read operation 148 and the delete operation 152 based on the secure credentials 180. It should be understood that other operations (e.g., the create operation 146, the update operation 150, or another operation) can be subscribed to by the client device 120 and the above example is for non-limiting illustrative purposes only.

According to the above-described example, the read operation 148 and the delete operation 152 can be facilitated based on user interactions with the single page application 142. For example, the single page application 142 assists the user 198 of the client device 120 in sending a request (e.g., an API call) to perform the read operation 148 or the delete operation 152. To illustrate, the API module 116 generates single page application data 182 that is indicative of the single page application 142. For example, the single page application data 182 indicates the user 198 can select from the read operation 148 or the delete operation 152, and additionally, the single page application data 182 indicates the API key of the API module 116. The single page application data 182 is code that is provided to the client device 120. The client device 120 renders a page as the user interface presentation 170 based on the single page application data 182. To illustrate, the display screen 166 of the client device 120 displays the user interface presentation 170 that includes an interactive visual display of the single page application 142 based on the single page application data 182. As a result, the user 198 of the client device 120 can interact with the single page application 142 via the user interface presentation 170 to generate requests (e.g., API calls). Interactions with the single page application 142 via the user interface presentation 170 are described with respect to FIGS. 2-4.

Figure 2:
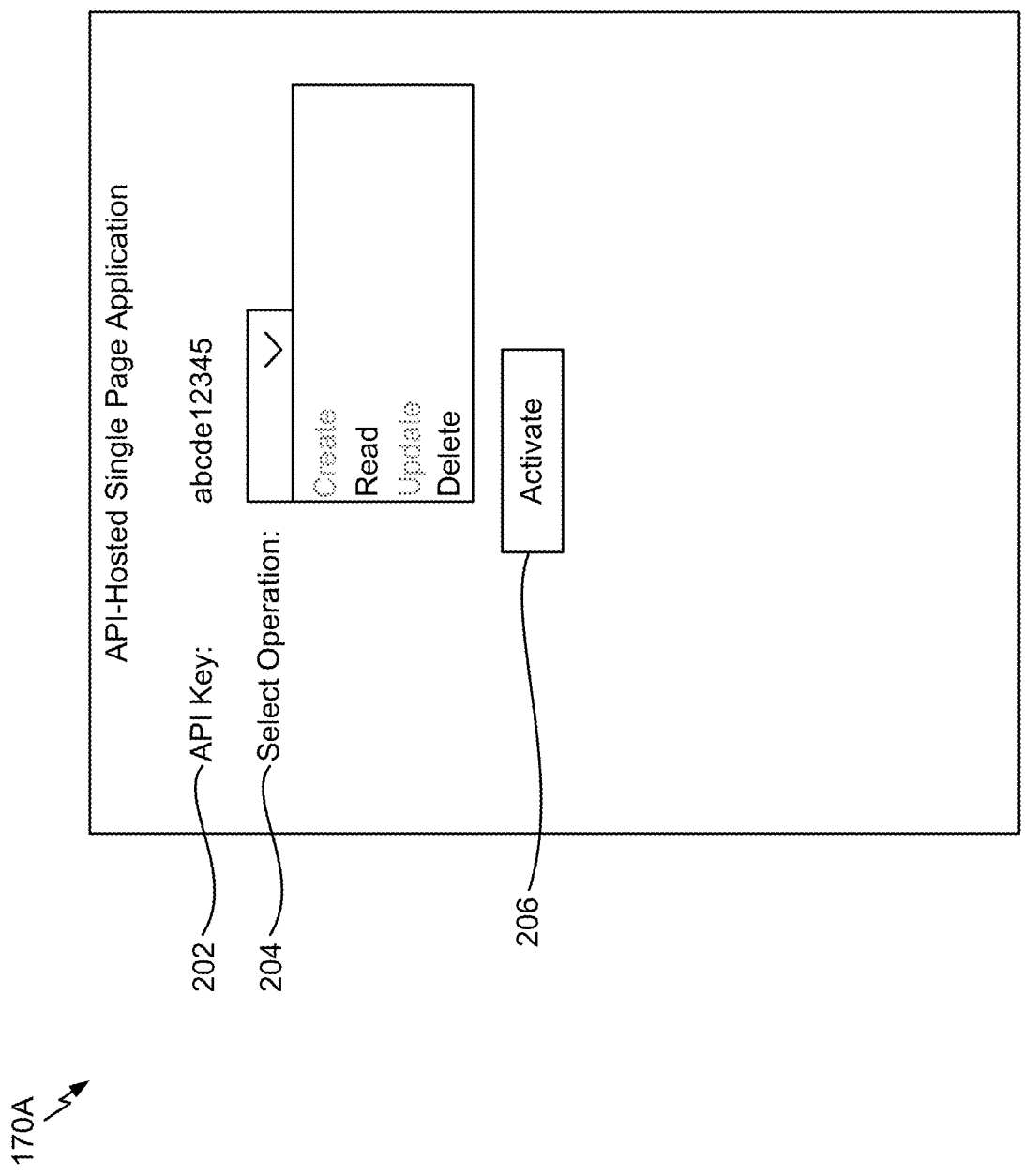
FIG. 2 is a diagram of a client-side user interface presentation that includes an interactive visual display of the single page application hosted by the application programming interface.

For example, referring to FIG. 2, a non-limiting example of a user interface presentation 170A is illustrated that includes an interactive visual display of the single page application 142 hosted by the API module 116. The user interface presentation 170A is generated based on the single page application data 182. The user interface presentation 170A includes an API key field 202, an operation selection field 204, and an activation button 206. It should be understood that the user interface presentation 170A is merely a non-limiting example of the user interface presentation 170 and can include additional (or fewer) fields.

An API key (e.g., "abcde12345") associated with the API module 116 is populated in the API key field 202. According to one implementation, the API key is automatically populated in the API key field 202 in response to receiving the single page application data 182. According to another implementation, the API key is provided to the client device 120 via the single page application data 182 and the user 198 manually inputs the API key into the API key field 202.

The user 198 of the client device 120 can use the operation selection field 204 to select between the read operation 148 and the delete operation 152. As described above, based on the secure credentials 180, the create operation 146 and the update operation 150 are unavailable. Although the operation selection field 204 is illustrated as a dropdown menu, in other implementations, the operation selection field 204 can have a different configuration (e.g., radio buttons, a text field, etc.). As a non-limiting example, the operation selection field 204 can include buttons corresponding to different operations 146-152.

After populating the API key into the API key field 202 and selecting an operation from the operation selection field 204, the user 198 of the client device 120 can click the activation button 206 to send a request 184 to the API module 116, as illustrated in FIG. 1. The request 184 corresponds to an API call instruction that instructs the API module 116 to perform a second API operation 144 based on the selection associated with the operation selection field 204. Performance of the second API operation 144 is described with respect to FIGS. 3-4.

In response to receiving the request 184, the API module 116 is configured to generate updated single page application data 186 that is indicative of an updated stage of the single page application 142. For example, the updated single page application data 186 can include instructions associated with operating the API module 116 (e.g., instructions for generating an API call instruction at the client device 102 to perform the read operation 148 at the API module 116). Additionally, the updated single page application data 186 can indicate additional fields to be populated at the client device 120 to successfully perform the read operation 148. The updated single page application data 186 is provided to the client device 120 and is displayed at the display screen 166 via the user interface presentation 170 (e.g., an updated version of the user interface presentation 170A).

Figure 3:
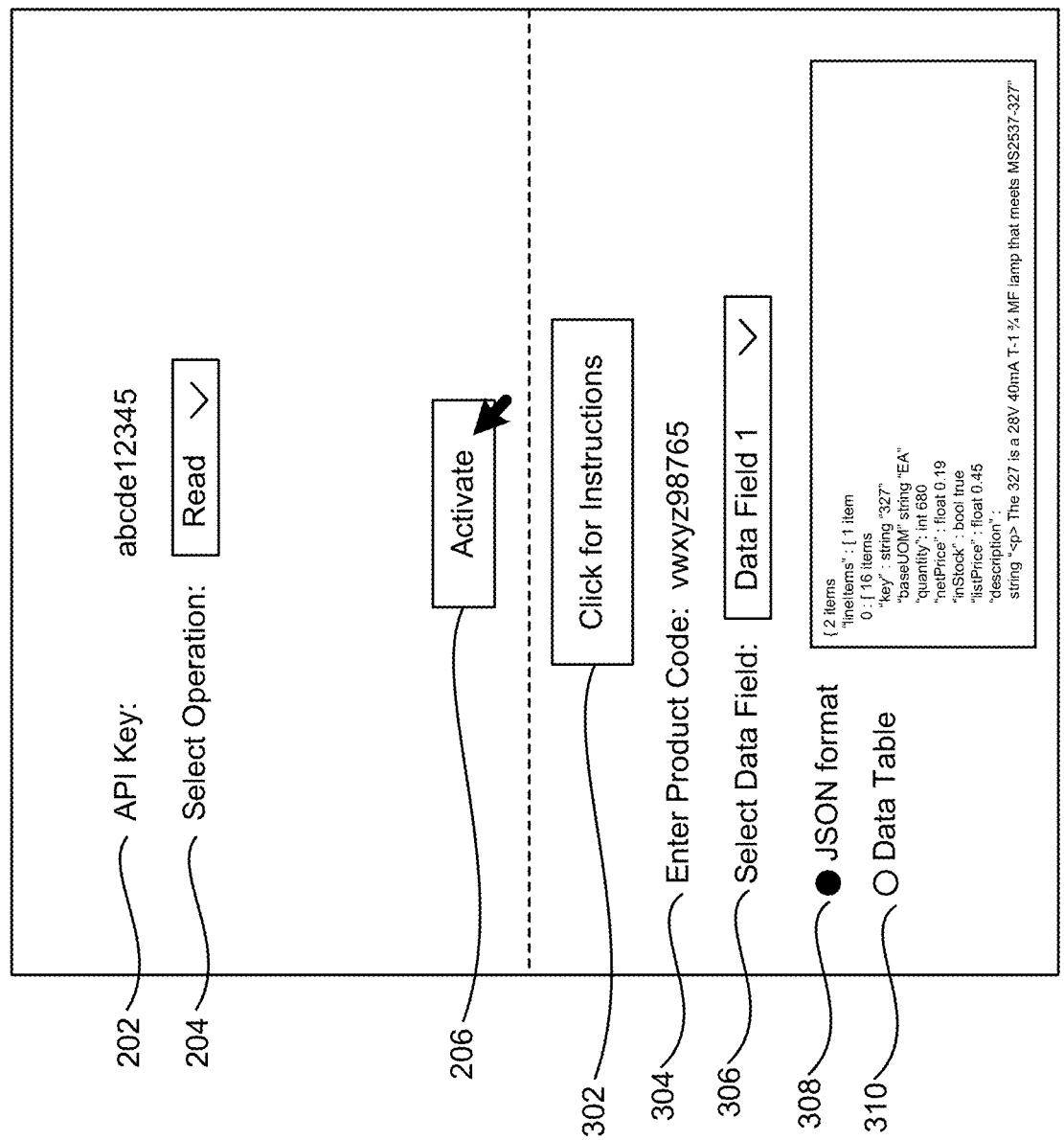
FIG. 3 is another diagram of the client-side user interface presentation that includes the interactive visual display of the single page application hosted by the application programming interface.
Figure 4:
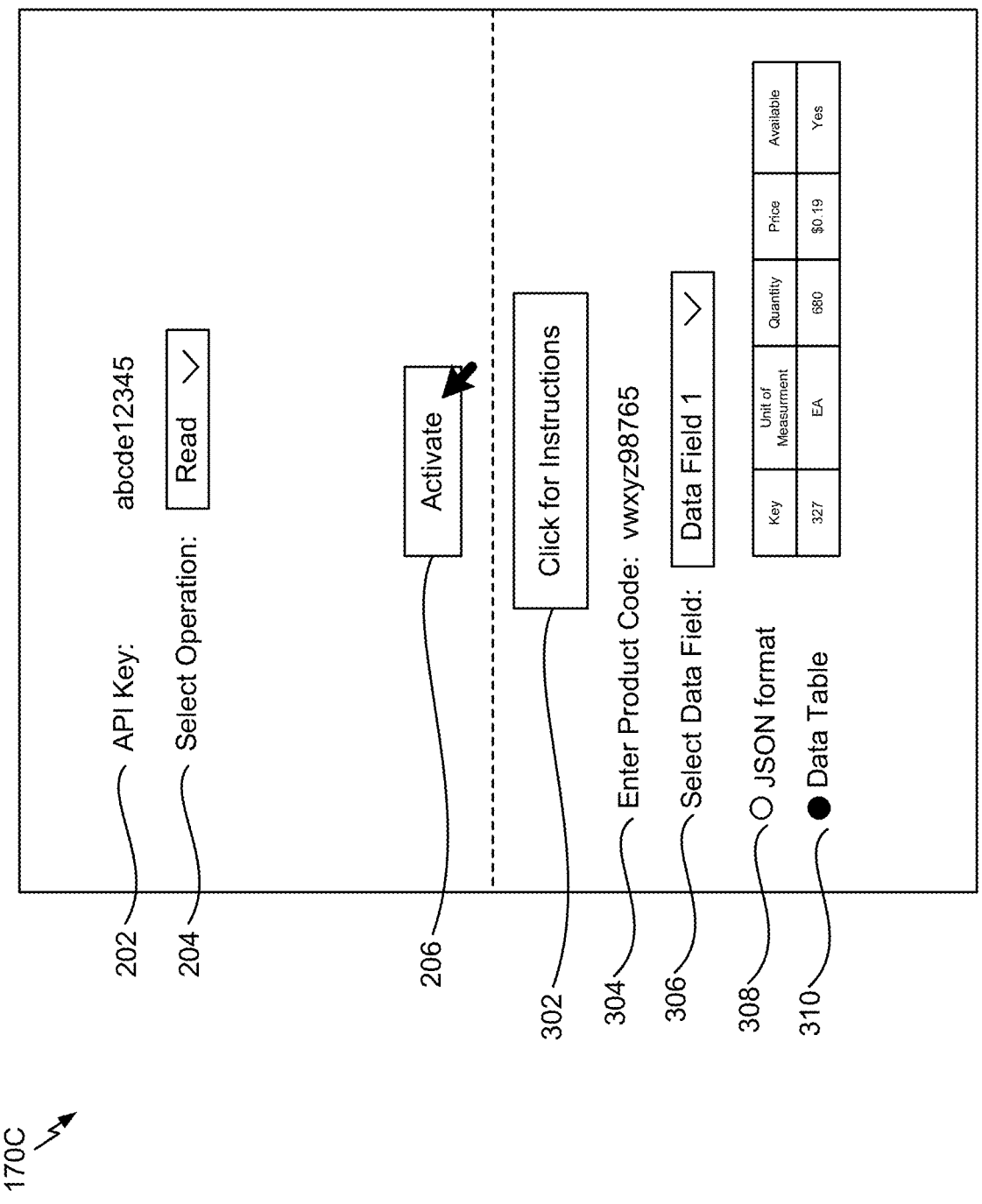
FIG. 4 is another diagram of the client-side user interface presentation that includes the interactive visual display of the single page application hosted by the application programming interface.

For example, referring to FIG. 3, another non-limiting example of a user interface presentation 170B is illustrated that includes the interactive visual display of the single page application 142 hosted by the API module 116. According to the user interface presentation 170B, the user 198 of the client device 120 selected the read operation 148. Thus, the request 184 instructs the API module 116 to update the single page application 142 to enable the user 198 to perform the read operation 148 as the second API operation 144.

As illustrated in FIG. 3, the user interface presentation 170B includes an option 302 that is selectable to view the instructions associated with operating the API module 116 (e.g., the instructions for generating an API call instruction at the client device 120 to perform the read operation 148 at the API module 116). Upon selecting the option 302, information (e.g., instructions, documentation, tips, examples, sample code, etc.) for operating the API module 116 are displayed at the user interface presentation 170B. In particular, although not shown in FIG. 3, information for generating an API call instruction to perform the read operation 148 can be displayed. The user 198 can read the information and apply the information to develop API client software. For example, the user 198 can use the information to learn how to interact with the API module 116, how to generate API call commands, etc.

The user interface presentation 170B also includes a prompt 304 for the user 198 of the client device 120 to enter a product code of a product. For example, if the user 198 desires to read data associated with a particular product, the product code corresponds to the particular product. In the illustrated example of FIG. 3, the product code entered by the user 198 (e.g., in a text input field) is "vwxyz98765." The user interface presentation 170B also includes a prompt 306 to select a data field. The selected data field can correspond to a particular type of data requested. As a non-limiting example, if the user 198 selects "Data Field 1", the particular type of data requested can correspond to a key for the particular product, a unit of measurement for the particular product, a quantity of the particular product, a price of the particular product, an availability determination for the particular product, etc. Thus, the responses to the prompts 304, 306 indicate the data that is to be read by the API module 116 during the read operation 148 (e.g., the second API operation 144). It should be understood the prompts 304, 306 are merely non-limiting examples of different prompts that can be included in the user interface presentation 170B. In other implementations, different prompts can be included in the user interface presentation 170B.

In response to populating the fields associated with the prompts 304, 306, the client device 102 generates a request 188 for data 190 associated with prompts 304, 306. For example, the request 188 can correspond to an API call instruction that instructs the API module 116 to perform the read operation 148 at the database 130. Thus, the data 190 corresponds to the user-selectable data, such as the key for the particular product, the unit of measurement for the particular product, the quantity of the particular product, the price of the particular product, the availability determination for the particular product, etc. Upon receiving the request 188, the API module 116 is configured to perform the read operation 148 to retrieve the data 190 associated with the prompts 304, 306 from the database 130. The API module 116 provides the data 190 to client device 120, and the client device 120 displays the data 190 via the user interface presentation 170B.

In the user interface presentation 170B illustrated in FIG. 3, the data 190 is provided in a JavaScript Object Notation (JSON) format. For example, the user 198 can select a JSON format option 308 to view the data 190 in the JSON format. In the user interface presentation 170C illustrated in FIG. 4, the data 190 is provide in a table format. For example, the user 198 can select a data table format option 310 to view the data 190 in the table format.

The techniques described with respect to FIGS. 1-4 enable the inexperienced user 198 to interact with the database 130 through the API module 116. For example, in scenarios where the user 198 is unable to successfully generate an API call instruction to read the data 190 from the database 130, the API module 116 can host the single page application 142 to assist the user 198 in retrieving the data 190. Prompts associated with the single page application 142 are displayed via the user interface presentation 170 at the client device 120 to enable the user to interact with the single page application 142. By populating fields responsive to the prompts, the single page application 142 enables the user 198 to exercise the second API operations 144 and work out interactions without developing specialized software.

Thus, generating and debugging code to perform a task associated with the API can be streamlined without requiring additional tools. Additionally, the single page application 142 can operate as a secure browser to share information for operating the application programming interface module 116. For example, by clicking the option 302 to view the instructions associated with operating the API module 116, the user 198 can view sample code, tips, and examples for developing API client software.

Figure 5:
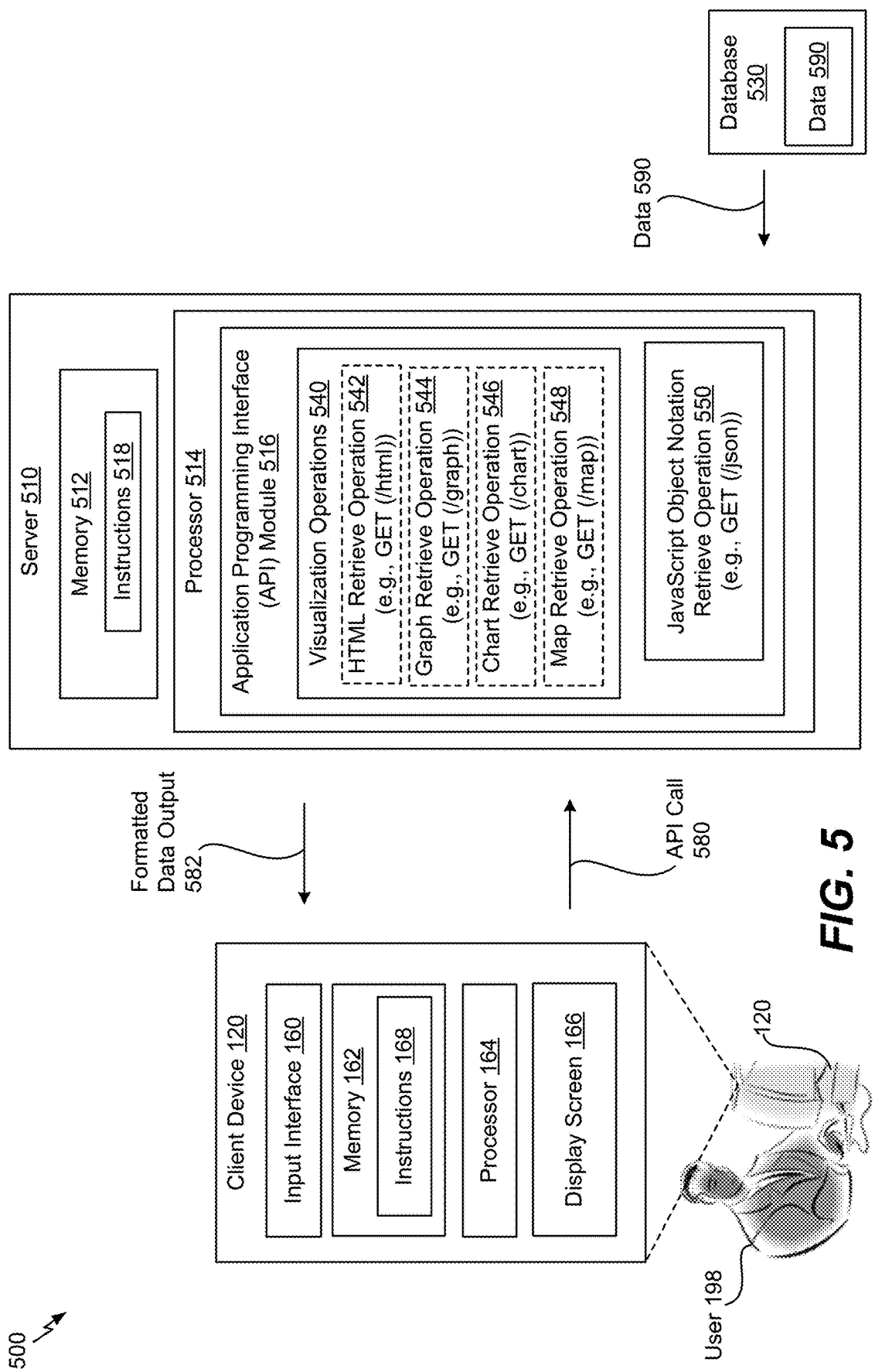
FIG. 5 is a diagram of a system that includes an application programming interface that is configured to transform data according to a data format to generate a formatted data output.

FIG. 5 is a diagram of a system 500 that includes an application programming interface that is configured to transform data according to a data format to generate a formatted data output. The system 500 includes a server 510, the client device 120 communicatively coupled to the server 510, and a database 530 communicatively coupled to the server 510. The database 530 can correspond to a backend data service or website.

The server 510 includes a processor 514 and a memory 512. An API module 516 is integrated into the processor 514. The memory 512 is a non-transitory computer-readable device that includes computer-executable program instructions 518 (or code). The computer-executable program instructions 518 are executable by the processor 514 (or the API module 516) to perform the operations described herein. The API module 516 can be implemented using hardware, software (e.g., processor-executable instructions), firmware, or a combination thereof. The server 510 can include other components that are not illustrated in FIG. 5. For example, the server 510 can include a transmitter, a receiver, one or more interfaces, etc.

In the implementation of FIG. 5, the API module 516 operates as a messaging interface between the client device 120 and the database 530 to enable the client device 120 to receive formatted data in response to an API call 580. To illustrate, the API module 516 can perform different visualization operations 540 that are associated with different formatted data. For example, the API module 516 can perform a hypertext markup language (HTML) retrieve operation 542 that transforms retrieved data into HTML text. To illustrate, FIG. 9A depicts an example of HTML text 902 generated by the API module 516. The API module 516 can also perform a graph retrieve operation 544 that transforms retrieved data into an image file of a graph. To illustrate, FIG. 9B depicts an example of an image file 904 of a graph 906 generated by the API module 516. The API module 516 can also perform a chart retrieve operation 546 that transforms retrieved data into an image file of a chart. To illustrate, FIG. 9C depicts an image file 908 of a chart 910 generated by the API module 516. The API module 516 can also perform a map retrieve operation 548 that transforms retrieved data into an image file of a map. To illustrate, FIG. 9D depicts an image file 912 of a map 914 generated by the API module 516. The API module 516 is configured to receive the API call 580 to at least one operation 542-548. The at least one operation 542-548 can include a "GET" command that is associated with at least one of a graph, a chart, a map, or HTML text, such as indicated by the GET command argument "/graph", "/chart", "/map", or "/html", respectively. Thus, the API call 580 indicates a requested data format. As explained below, upon execution of the "GET" command, the API module 516 receives data 590 from the database 530 and transforms the data into the requested data format. For example, based on the format indicated in the API call 580, a corresponding operation 542-548 of the API module 516 transforms the data into a graph, a chart, a map, or HTML text and sends the transformed data to the client device 120. For ease of explanation, the requested data format of the API call 580 is a graph format. However, the techniques described herein can be implemented using any of the above-described formats or any additional formats.

In response to receiving the API call 580, the API module 516 is configured to instruct (e.g., call) a JSON retrieve operation 550 (on behalf of the API call 580) to retrieve data 590 from the database 530. In this implementation, the data 590 has a JSON format. In response to retrieving the data 590, the API module 516 is configured to perform the graph retrieve operation 544. For example, the API module 516 transforms the data 590 according to the requested data format (e.g., the graph format) to generate a formatted data output 582. In this scenario, the API module 516 transforms the JSON data 590 into a graph image file (e.g., the formatted data output 582). The formatted data output 582 is transmitted to the client device 120. According to one implementation, the formatted data output 582 can correspond to a visualization that is rendered by the API module 516 based on the API call 580. For example, the API module 516 can render a visualization that corresponds to an image of one of a chart, a graph, a map, or HTML text. The visualization is provided to the client device 120.

The techniques described with respect to FIG. 5 enable the API module 516 to transform the data 590 (e.g., the JSON data) into a requested format. For example, the API module 516 can transform the data 590 into HTML text, an image file of a graph, an image file of a chart, or an image file of a map.

Figure 6:
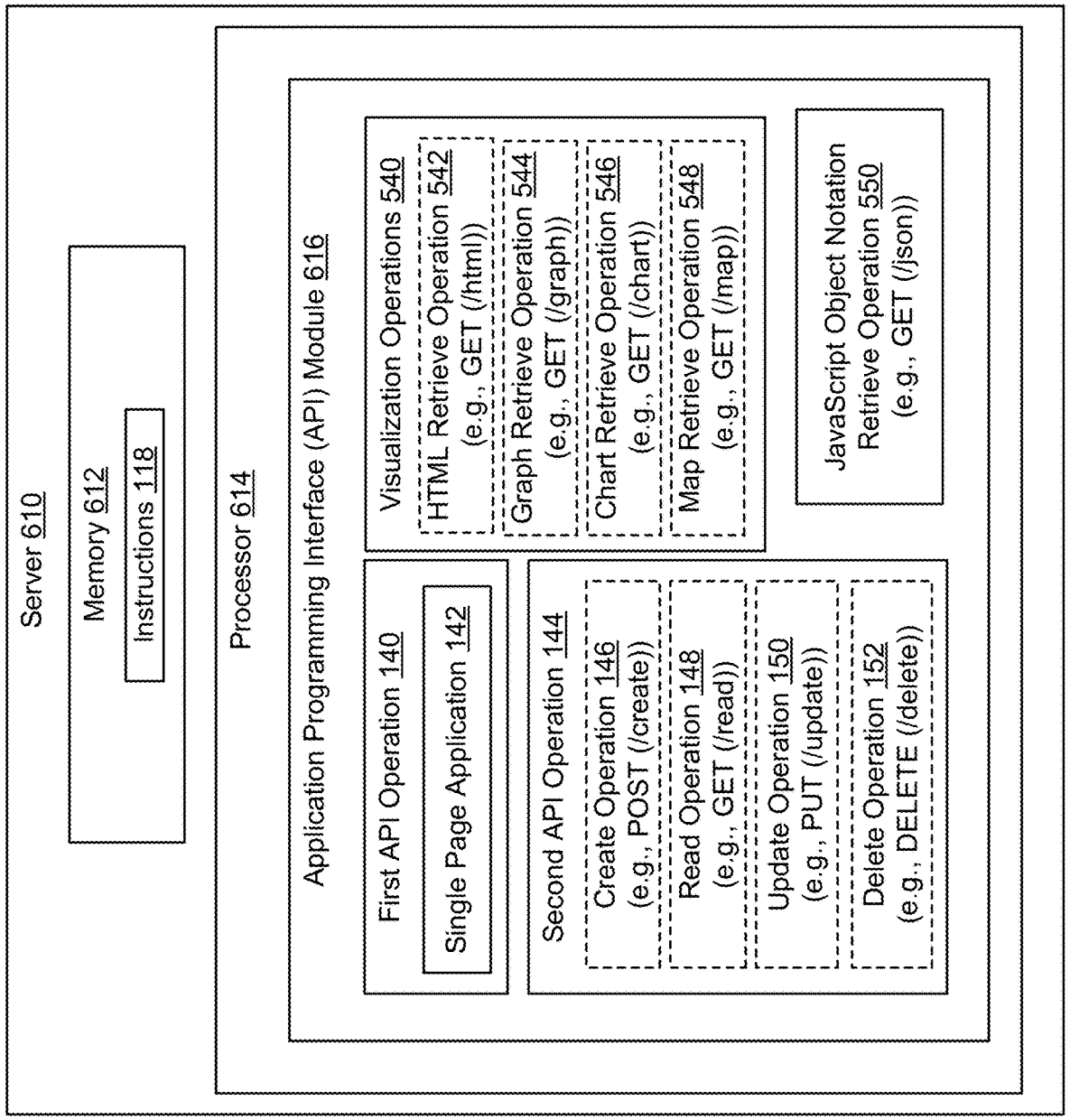
FIG. 6 is a diagram a server that includes an application programming interface that is configured to host a single page application and transform data according to data format to generate a formatted data output.

FIG. 6 is a diagram of a server 610 that includes an application programming interface that is configured to host a single page application and transform data according to data format to generate a formatted data output. The server includes a processor 614 and a memory 612. An API module 616 is integrated into the processor 614. The memory 612 is a non-transitory computer-readable device that includes computer-executable program instructions 618 (or code). The computer-executable program instructions 618 are executable by the processor 614 (or the API module 616) to perform the above-described operations. The API module 616 can be implemented using hardware, software (e.g., processor-executable instructions), firmware, or a combination thereof. The server 610 can include other components that are not illustrated in FIG. 6. For example, the server 610 can include a transmitter, a receiver, one or more interfaces, etc.

The API module 616 is configured to perform the operations of the API module 116 of FIG. 1 and the operations of the API module 516 of FIG. 5. For example, the API module 616 is configured to perform the first API operation 140, the second API operation 144, the visualization operations 540 (e.g., the format transformation operations), and the JSON retrieve operation 550. Thus, the API module 616 is configured to perform the API operations described with respect to FIGS. 1-5. In an illustrative example, the single page application 142 is used to perform one or more of the operations 542-548 in a similar manner as described for the operations 146-152. For example, each of the operations 542-548 can appear as selectable options in the operation selection field 204 of FIGS. 2-4.

Figure 7:
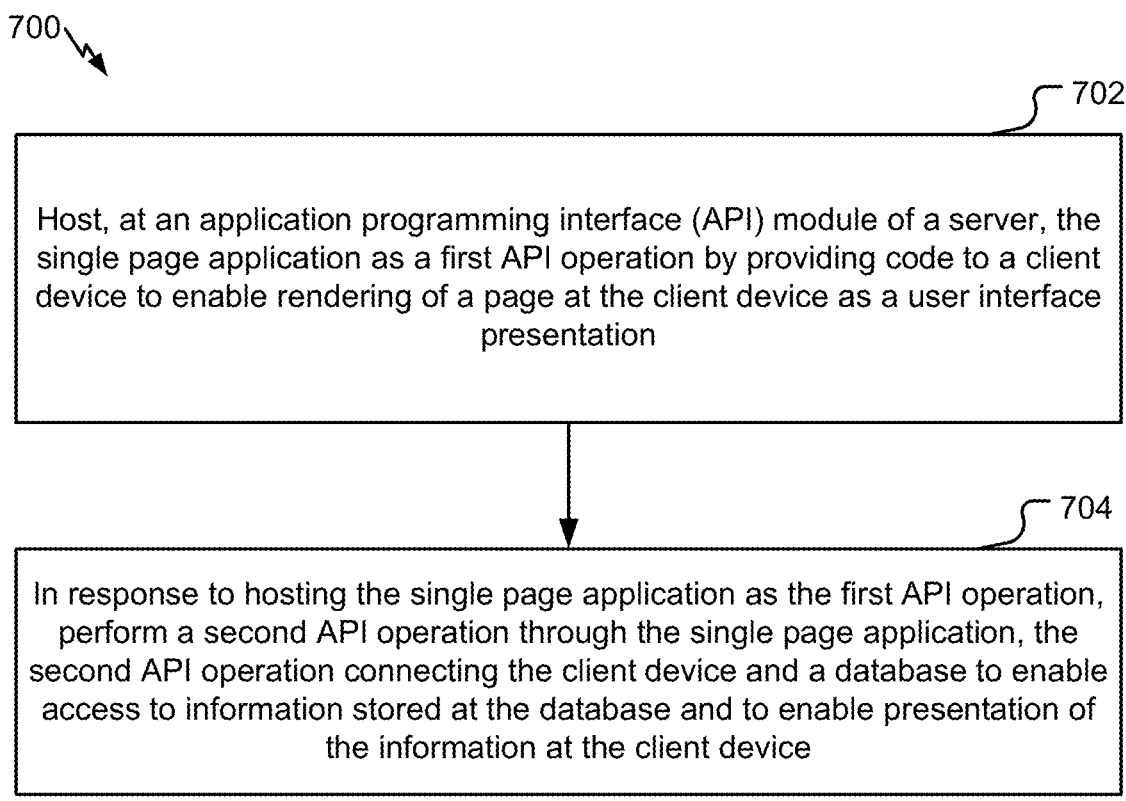
FIG. 7 is a flowchart of a method of hosting a single page application.

FIG. 7 is a flowchart of a method 700 of hosting a single page application. The method 700 may be performed by the server 110 of FIG. 1, the server 610 of FIG. 6, the API module 116 of FIG. 1, the API module 616 of FIG. 6, or a combination thereof.

The method 700 includes hosting, at an API module of a server, a single page application as a first API operation by providing code to a client device to enable rendering of a page at the client device as a user interface presentation, at 702. For example, the API module 616 hosts the single page application 142 as the first API operation 140. The single page application 142 is provided to the client device 120 as the user interface presentation 170. To illustrate, the server 110 provides the single page application data 182 (e.g., code) to the client device 120 to enable rendering of a page at the client device 120 as the user interface presentation 170.

The method 700 also includes in response to hosting the single page application as the first API operation, performing a second API operation through the single page application, at 704. The second API operation connects the client device and a database to enable access to information stored at the database and to enable presentation of the information at the client device. For example, the API module 116 of FIG. 1 or the API module 616 of FIG. 6 performs the second API operation 144 through the single page application 142. The second API operation 144 includes the create operation 146, the read operation 148, the update operation 150, or the delete operation 152. The single page application 142 receives the secure credentials 180 from the client device 120, and the secure credentials 180 indicate authorized access associated with the second API operation 144. For example, the secure credentials 180 indicate which operation 146-152 the user 198 is authorized to access. According to one implementation, the second API operation is associated with a component of a vehicle such as an aircraft, such as an operation to access component data (e.g., inventory data, cost data, etc.) from a database.

According to one implementation of the method 700, in response to receiving the secure credentials 180, the single page application 142 is configured to perform an API call to the second API operation 144. The single page application 142 is also configured to retrieve the data 190 from the database 130 associated with the second API operation 144 and provide the data 190 to the client device 120 via the user interface presentation 170. According to one implementation, the single page application 142 can perform an API call to one of the operations 542-548 instead of the operations 146-152.

According to one implementation of the method 700, the single page application 142 is operable to present information to the client device 120 about the API module 116 via the user interface presentation 170. For example, referring to FIGS. 3-4, the user 198 can click the option 302 to view the instructions associated with operating the API module 116.

The method 700 enables the inexperienced user 198 to interact with the database 130 through the API module 116. For example, in scenarios where the user 198 is unable to successfully generate an API call instruction to read the data 190 from the database, the API module 116 can host the single page application 142 to assist the user 198 in retrieving the data 190. Prompts associated with the single page application 142 are displayed via the user interface presentation 170 at the client device 120 to enable the user to interact with the single page application 142. By populating fields responsive to the prompts, the single page application 142 enables the user 198 to exercise the second API operations 144 (or the visualization operations) and work out interactions without developing specialized software. Thus, task associated with the API can be streamlined without requiring additional tools. Additionally, the single page application 142 can operate as a secure browser to share information for operating the application programming interface module 116. For example, by selecting the option 302 to view the instructions associated with operating the API module 116, the user 198 can view sample code, tips, and examples for developing API client software.

Figure 8:
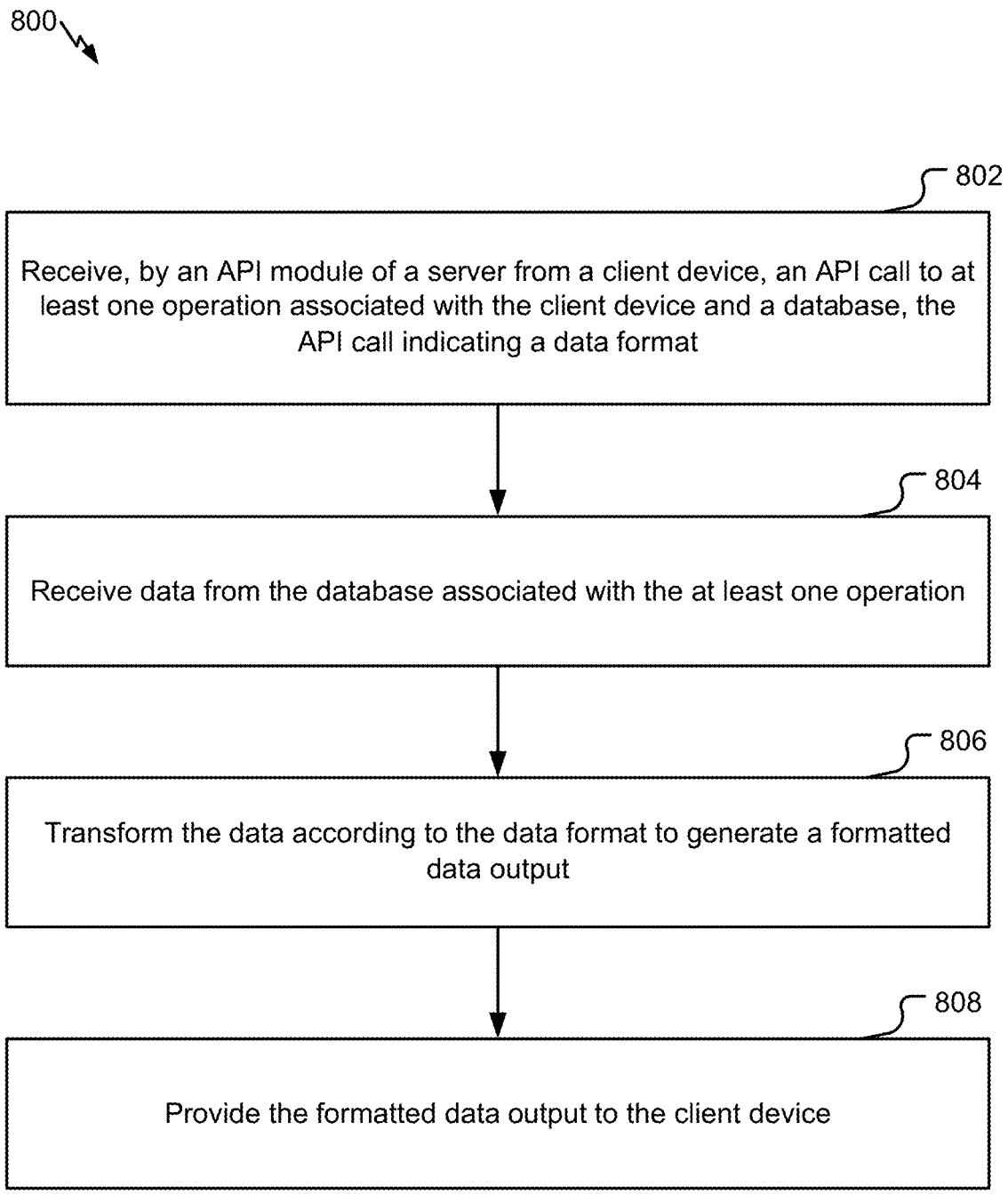
FIG. 8 is a flowchart of a method of operating an application programming interface.

FIG. 8 is a flowchart of a method 800 of operating an API. The method 800 may be performed by the server 510 of FIG. 5, the server 610 of FIG. 6, the API module 116 of FIG. 1, the API module 516 of FIG. 5, or a combination thereof.

The method 800 includes receiving, by an API module of a server from a client device, an API call to at least one operation associated with the client device and a database, at 802. The API call indicates a data format. For example, API module 516 receives the API call 580 to at least one operation 542-548. In the example described with respect to FIG. 5, the requested format of the API call 580 is a graph format.

The method 800 also includes receiving data from the database associated with the at least one operation, at 804. For example, in response to receiving the API call 580, the API module 516 instructs (e.g., calls) the JSON retrieve operation 550 (on behalf of the API call 580) to retrieve data 590 from the database 530. In this implementation, the data 590 has a JSON format.

The method 800 also includes transforming the data according to the data format to generate a formatted data output, at 806. For example, the API module 516 transforms the data 590 according to the requested data format (e.g., the graph format) to generate a formatted data output 582. In this scenario, the API module 516 transforms the JSON data 590 into a graph image file (e.g., the formatted data output 582). The method 800 also includes providing the formatted data output to the client device, at 808. For example, the API module 516 transmits the formatted data output 582 to the client device 120.

The method 800 enables the API module 516 to transform the data 590 (e.g., the JSON data) into a requested format. For example, the API module 516 can transform the data 590 into HTML text, an image file of a graph, an image file of a chart, or an image file of a map.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A system for hosting a single page application, the system comprising:
a server configured to host an application programming interface (API) module, the API module configured to:
perform a first API operation to host the single page application by providing code to a client device to enable rendering of a page at the client device as a user interface presentation, the code comprising instructions for generating an API call, wherein one or more prompts associated with the single page application are displayed via the user interface presentation at the client device;
receive user input based on the one or more prompts;
in response to the user input, enable one or more fields corresponding to the one or more prompts to be populated;
receive the API call requesting the API module to perform a second API operation based on the one or more populated fields;
perform the second API operation through the single page application based at least in part on the one or more populated fields, the second API operation connecting the client device and a database to enable access to information stored at the database; and
update the single page application to enable presentation of the information at the client device that corresponds to the one or more populated fields.

2. The system of claim 1, wherein the single page application is a web application that loads a single hypertext markup language (HTML) page and dynamically updates the HTML page upon user interaction with the web application.

3. The system of claim 1, wherein the single page application is operable to present information to the client device about the API module via the user interface presentation and wherein the one or more prompts are configured to assist user interaction with at least one of the first and second API operations.

4. The system of claim 1, wherein the information is stored in the database in the untransformed data format.

5. The system of claim 1, wherein the second API operation comprises a create operation, a read operation, an update operation, or a delete operation.

6. The system of claim 1, wherein the single page application is configured to receive secure credentials from the client device, the secure credentials indicating authorized access associated with the second API operation.

7. The system of claim 6, wherein, in response to receiving the secure credentials, the single page application is further configured to:
perform the API call to the second API operation;
receive data from the database associated with the second API operation; and
provide the data to the client device via the user interface presentation.

8. The system of claim 7, wherein the data is provided to the client device in a JavaScript Object Notation (JSON) format, and wherein the user interface presentation comprises a data table.

9. The system of claim 4, wherein the second API operation is associated with a component of an aircraft.

10. The system of claim 1, wherein the server is further configured to:
receive, from the client device, a second API call to at least one other operation associated with the client device and the database;
receive data from the database associated with the at least one other operation;
transform the data to generate a formatted data output; and
provide the formatted data output to the client device.

11. A method of hosting a single page application, the method comprising:
hosting, at an application programming interface (API) module of a server, the single page application as a first API operation by providing code to a client device to enable rendering of a page at the client device as a user interface presentation, the code comprising instructions for generating an API call, wherein one or more prompts associated with the single page application are displayed via the user interface presentation at the client device;
receive user input based on the one or more prompts;
in response to the user input, enable one or more fields corresponding to the one or more prompts to be populated;
receive the API call requesting the API module to perform a second API operation based on the one or more populated fields;
in response to hosting the single page application as the first API operation, performing the second API operation through the single page application based at least in part on the one or more populated fields, the second API operation connecting the client device and a database to enable access to information stored at the; and
updating the single page application to enable presentation of the information at the client device that corresponds to the one or more populated fields.

12. The method of claim 11, wherein the single page application is a web application that loads a single hypertext markup language (HTML) page and dynamically updates the HTML page upon user interaction with the web application.

13. The method of claim 12, wherein the second API operation comprises a create operation, a read operation, an update operation, or a delete operation.

14. The method of claim 12, further comprising presenting information to the client device about the API module via the user interface presentation of the single page application.

15. The method of claim 12, further comprising receiving, at the single page application, secure credentials from the client device, the secure credentials indicating authorized access associated with the second API operation.

16. The method of claim 15, in response to receiving the secure credentials, further comprising:
performing an API call to the second API operation;
receiving data from the database associated with the second API operation; and
providing the data to the client device via the user interface presentation.

17. The method of claim 16, wherein the data is provided to the client device in a JavaScript Object Notation (JSON) format.

18. An apparatus for operating an application programming interface (API), the apparatus comprising:
 a server communicatively coupled to a client device and to a database, the server comprising an API module configured to:
  receive, from the client device, a first API call to at least one operation associated with the client device and the database, the first API call generated by a single page application based on one or more prompts associated with the single page application that are displayed via a user interface presentation at the client device;
  receive user input based on the one or more prompts;
  in response to the user input, enable one or more fields corresponding to the one or more prompts to be populated;
  receive a second API call generated by the single page application, the second API call requesting the API module to perform a second API operation based on the one or more populated fields;
  perform the second API operation through the single page application based at least in part on the one or more populated fields, the second API operation connecting the client device and a database to enable access to information stored at the database;
  update the single page application to enable presentation of the information at the client device that corresponds to the one or more populated fields.

19. The apparatus of claim 18, wherein the at least one operation comprises a "GET" command, and wherein the "GET" command is associated with at least one of a graph, a chart, a map, or hypertext markup language (HTML) text.

20. The apparatus of claim 18, wherein transforming the data includes generating an image file of a chart representative of the data, a graph representative of the data, or a map representative of the data, and wherein the image file is provided as the formatted data output to the client device.

21. The apparatus of claim 18, wherein the server is further configured to:
 perform a particular API operation to host a single page application, the single page application operable to provide a user interface presentation to the client device; and
 perform a second particular API operation through the single page application, the second particular API operation associated with the client device and the database.

22. A client device comprising:
 a memory; and
 a processor coupled to the memory, the processor configured to:
  execute code provided by a server to render a page associated with a single page application hosted by the server to be displayed at a display screen as a user interface presentation;
  send a request for an API operation through the single page application, the API operation connecting the client device and a database to enable access to information stored at the database and to enable presentation of the information at the client device via the single page application;
  receive user input via the single page application, the user input selecting a display format, wherein one or more prompts associated with the single page application are displayed via the user interface presentation at the client device, and one or more fields are populated responsive to the user input received at the one or more prompts;
  receive an API call generated by the single page application based at least one the one or more populated fields, the API call requesting the API module to perform a second API operation;
  perform the second API operation through the single page application based at least in part on the API call;
  update the single page application to present the information that corresponds to the one or more populated fields.

23. The client device of claim 22, wherein the single page application includes an input element and wherein the user input is received via the input element.

24. The client device of claim 22, wherein the single page application is a web application that loads a single hypertext markup language (HTML) page and dynamically updates the HTML page upon user interaction with the web application.

25. The client device of claim 22, wherein the single page application is operable to present information about an application programming interface (API) module of the server via the user interface presentation.

26. An apparatus for operating an application programming interface (API), the apparatus comprising:
 a server communicatively coupled to a client device, the server comprising an API module configured to:
  provide code for generating an API call to at least one operation associated with the client device, the code enabling the API call to be generated based on one or more prompts associated with a single page application that are displayed via a user interface presentation at the client device;
  receive user input based on the one or more prompts;
  in response to the user input, enable one or more fields corresponding to the one or more prompts to be populated;
  based at least on the one or more prompts, generate the API call, the API call requesting the API module to perform a second API operation based on the one or more populated fields; and
  update the visualization to enable presentation at the client device of the information that corresponds to the one or more populated fields.

* * * * *